(12) United States Patent
Hermann

(10) Patent No.: US 8,052,869 B2
(45) Date of Patent: Nov. 8, 2011

(54) CHAMBER FILTER PLATE AND METHOD OF PRODUCING THE SAME

(75) Inventor: Manfred Hermann, Nürnberg (DE)

(73) Assignee: JVK Filtration Systems GmbH, Georgensgmuend (DE)

(*) Notice: Subject to any disclaimer, the term of this patent is extended or adjusted under 35 U.S.C. 154(b) by 300 days.

(21) Appl. No.: 11/875,989

(22) Filed: Oct. 22, 2007

(65) Prior Publication Data

US 2008/0087595 A1    Apr. 17, 2008

Related U.S. Application Data

(63) Continuation of application No. PCT/EP2006/003613, filed on Apr. 20, 2006.

(30) Foreign Application Priority Data

Apr. 22, 2005    (DE) .................. 20 2005 006 535 U

(51) Int. Cl.
| | |
|---|---|
| B01D 25/00 | (2006.01) |
| B01D 25/12 | (2006.01) |
| B29C 49/00 | (2006.01) |
| B29D 22/00 | (2006.01) |
| B01D 25/02 | (2006.01) |
| B01D 25/21 | (2006.01) |

(52) U.S. Cl. ........ 210/224; 210/227; 210/228; 210/229; 210/231; 264/570; 264/572; 264/573

(58) Field of Classification Search .................. None
See application file for complete search history.

(56) References Cited

U.S. PATENT DOCUMENTS

| | | | | |
|---|---|---|---|---|
| 856,596 | A | * | 6/1907 | Merrill .......................... 210/209 |
| 964,725 | A | * | 7/1910 | Whiting ........................ 210/227 |
| 2,796,993 | A | * | 6/1957 | Imershein ..................... 210/231 |
| 4,543,187 | A | * | 9/1985 | Steppacher ................... 210/231 |
| 4,643,827 | A | | 2/1987 | Becker |
| 5,770,063 | A | | 6/1998 | Ruhland |
| 6,365,043 | B1 | | 4/2002 | Haberle |

FOREIGN PATENT DOCUMENTS

| | | |
|---|---|---|
| CH | 691252 A5 | 6/2001 |
| DE | 2720904 A1 | 11/1978 |
| DE | 3425163 A1 | 1/1986 |
| DE | 19602977 C1 | 2/1997 |
| DE | 19943584 A1 | 3/2001 |
| DE | 10138895 A1 | 3/2003 |
| FR | 1024255 A | 3/1953 |
| JP | 57001412 A | 1/1982 |

* cited by examiner

*Primary Examiner* — Benjamin Kurtz
(74) *Attorney, Agent, or Firm* — Laurence A. Greenberg; Werner H. Stemer; Ralph E. Locher

(57) ABSTRACT

A chamber filter plate for a filter press includes a plate plane having a longitudinal direction and a crosswise direction. A plate body has a surface with a thickness. A plate edge frames the plate body and is thicker than the surface of the plate body. The plate edge has at least one hollow channel formed therein, extending in the longitudinal and/or crosswise direction. A method of producing a chamber filter plate is also provided.

7 Claims, 2 Drawing Sheets

CHAMBER FILTER PLATE AND METHOD OF PRODUCING THE SAME

CROSS-REFERENCE TO RELATED APPLICATION

This is a continuation, under 35 U.S.C. §120, of copending International Application No. PCT/EP2006/003613, filed Apr. 20, 2006, which designated the United States; this application also claims the priority, under 35 U.S.C. §119, of German Patent Application DE 20 2005 006 535.8, filed Apr. 22, 2005; the prior applications are herewith incorporated by reference in their entirety.

BACKGROUND OF THE INVENTION

Field of the Invention

The invention relates to a chamber filter plate for a filter press. Such chamber filter plates include a plate body and a plate edge which completely encompasses the plate body and is thicker than the plate surface of the plate body. The plate edge therefore has a greater thickness than the plate body. A cavity, which is formed within the plate edge, has the plate body as its base. If two or more chamber filter plates are placed in succession to form a filter packet, the edges adjoin each other, forming a filter chamber therebetween within the edges.

When the chamber filter plate is fabricated from plastic, the sealing edge member, which is much thicker than the plate body, requires an appreciably longer cooling time than the plate body in the fabrication process. That increases manufacturing time for the filter plate. Undesirable stresses also develop in the material in the region of the plate edge during the long cooling process.

BRIEF SUMMARY OF THE INVENTION

It is accordingly an object of the invention to provide a chamber filter plate and a method of producing the same, which overcome the hereinafore-mentioned disadvantages of the heretofore-known devices and methods of this general type and which avoid the development of stresses in the region of the plate edge during cooling.

With the foregoing and other objects in view there is provided, in accordance with the invention, a chamber filter plate for a filter press. The chamber filter plate comprises a plate plane having a longitudinal direction and a crosswise direction, a plate body having a surface with a thickness, and a plate edge framing the plate body and being thicker than the surface of the plate body. The plate edge has at least one hollow channel formed therein extending in the longitudinal and/or crosswise direction.

In this way, the actual wall thickness of the plate edge, thus the wall thickness of the part of the edge which in practice is formed of plastic, is clearly reduced in comparison to the wall thickness of the edge or edges of customary chamber filter plates according to the prior art. By suitable dimensioning of the hollow space, the wall thickness of the plate edge which surrounds the hollow space can be selected in such a way that it corresponds exactly to the wall thickness of the plate body. As a result of this correspondence in wall thicknesses, the cooling of the overall chamber filter plate occurs much more uniformly than according to the prior art.

In accordance with another feature of the invention, there is a plurality of mutually separate hollow channels in the plate edge or a single hollow channel which extends through the entire plate edge and completely around the plate edge.

In accordance with a further feature of the invention, the at least one hollow channel serves as a feed channel or outlet channel for the material undergoing filtration in the device. If this use as a feed channel or outlet channel is combined with a plurality of mutually separate hollow channels, different channel systems may be provided for different applications. For example, one part of the hollow channel can be used as a feed channel and another part as an outlet channel. If instead a single hollow channel which extends completely through the extent of the plate edge is provided, in practice the channel may be used only as a feed channel or an outlet channel. However, this embodiment has the advantage that the wall thickness of the plate edge surrounding the hollow channel is uniform over the entirety of the longitudinal and crosswise dimensions of the chamber filter plate. Such a uniform wall thickness leads to particularly uniform cooling behavior during manufacture.

In accordance with a concomitant feature of the device or step of the method of the invention, it is particularly advantageous if the hollow channel is produced in the plate edge through the use of a known gas interior pressure method or water interior pressure method. In this connection, during the fabrication, a fluid which is introduced into the mold for the chamber filter plate serves as a mold core. The fluid so injected may include, e.g., a slurry or paste, a liquid medium, or a gaseous medium. This fluid acts in the manner of a mold core, to form the hollow space for the hollow channel. After the chamber filter plate is cooled down, openings must be provided in the plate edge in order to enable removal of the medium from the hollow channel of the plate edge.

Other features which are considered as characteristic for the invention are set forth in the appended claims, noting that the dependent claims contain advantageous refinements of the invention, some or all of which are independently patentable.

Although the invention is illustrated and described herein as embodied in a chamber filter plate and a method of producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
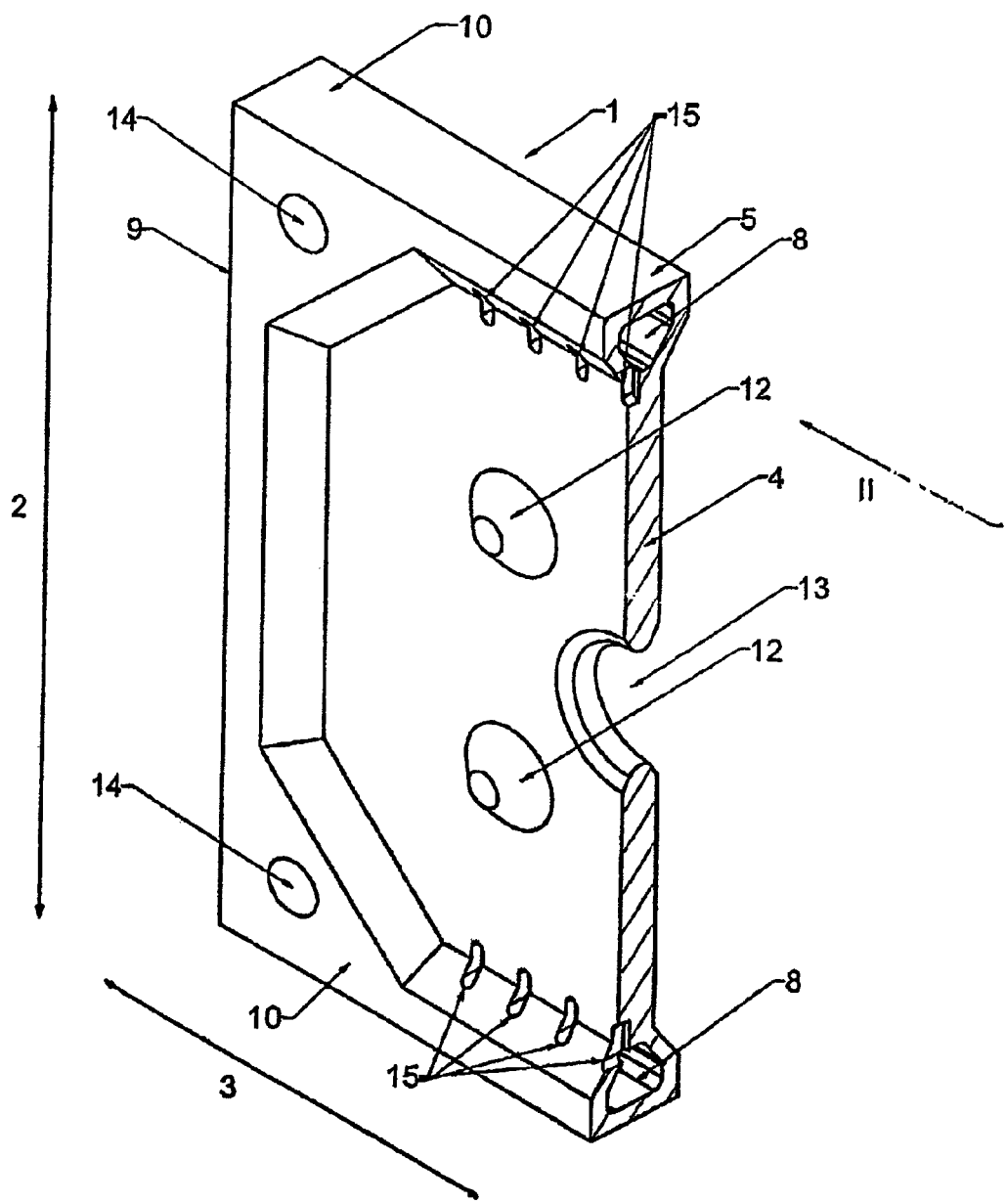
FIG. 1 is a fragmentary, diagrammatic, perspective view of a chamber filter plate which has been cutoff in the center.
Figure 2:
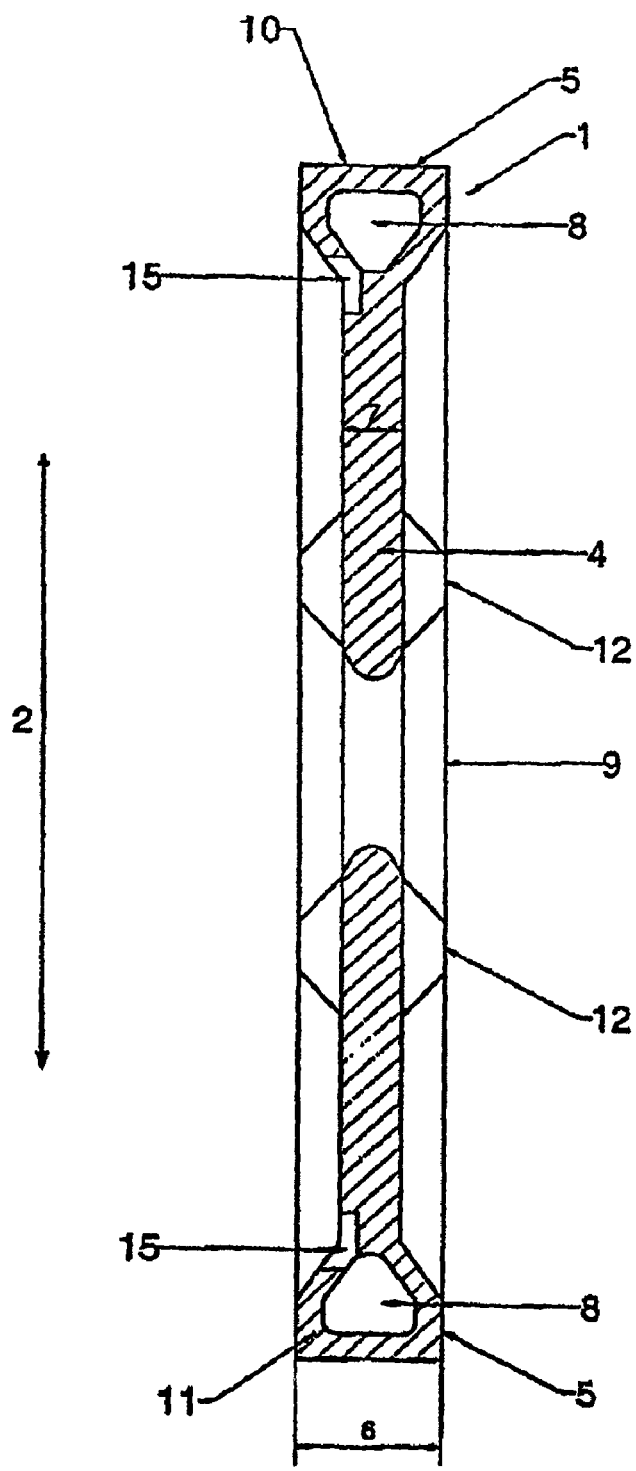
FIG. 2 is a front-elevational view, as seen along an arrow II of FIG. 1.

Referring now to the figures of the drawings in detail and first, particularly, to FIG. 1 thereof, there is seen a chamber filter plate 1 having a plate plane defined by a longitudinal direction 2 and a crosswise direction 3. The chamber filter plate 1 includes a plate body 4 and a plate edge 5, which externally borders the plate body. It may be seen particularly well from FIG. 2 that the thickness 6 of the plate edge 5 is substantially greater than the thickness 7 of the plate body 4. In the illustrated exemplary embodiment, the thickness 6 of the edge member is nearly twice the thickness 7 of the plate body.

A hollow channel 8 is provided in the plate edge 5, to reduce the wall thickness of the plate edge. This channel 8 extends in the crosswise direction 3 in the chamber filter plate 1. In the case when the channel 8 extends along the entire periphery, the channel 8 also extends along a longitudinal side 9 of the plate, in the longitudinal direction 2. The channel also extends along laterally extending sides 10 of the plate, which are cutoff in FIG. 1. It is seen from FIG. 2 that a remaining or ultimate wall thickness 11 of the hollow channel 8 is less than the thickness 7 of the plate body 4. The dimensioning of the plate body thickness 7 and the hollow channel thickness 11 in the plate edge or peripheral region 5 of the plate results in the desired uniform cooling behavior of the chamber filter plate 1 during the cooling process, according to the invention.

Two supporting protuberances 12 are provided on the plate body 4 of the plate 1, for supporting a membrane or for supporting the plate body 4 against corresponding protuberances on an adjacent chamber filter plate. A filter fabric, which is also required for the operation of the chamber filter plate 1, is omitted in the figures for the sake of simplification.

FIG. 1 also shows an inlet opening 13, which is cut in half in the figure, for admitting material which is to undergo filtration, and outlet openings 14 for filtrate. In the illustrated exemplary embodiment, the filtrate outlet openings 14 are disposed in corner regions of the plate edge 5 of the chamber filter plate 1. It is possible to place the filtrate outlet openings 14 in such a way that the hollow channels 8 open into the openings 14 to whatever degree is desired. In any event, the filtrate outlet openings 14 are disposed parallel to the respective thickness dimensions 6, 7 of the plate edge and the plate body, i.e. transverse to the longitudinal direction 2 and the crosswise direction 3. The filtrate outlet openings 14 should not be confused with the hollow channels 8.

Finally, the exemplary embodiment has outlet slits 15 which are cut into the hollow channel 8 and which open out laterally therefrom. The purpose of these outlet slits 15 is to allow fluid which has served as a molding core for the chamber filter plate 1 to be removed from the hollow channels 8 after the fabrication of the plate 1, that is after the chamber filter plate 1 has cooled down.

The invention claimed is:

1. A chamber filter plate for a filter press, the chamber filter plate comprising:
    a plate plane having a longitudinal direction and a crosswise direction;
    a plate body having a surface with a thickness; and
    a plate edge framing said plate body and being thicker than said surface of said plate body, said plate edge having longitudinal sides and laterally extending sides between said longitudinal sides;
    said plate edge having a plurality of mutually separate hollow channels formed therein, each of said longitudinal sides and said laterally extending sides having a respective one of said mutually separate hollow channels extending over substantially an entire length thereof, said hollow channels forming outlet channels for the chamber filter plate, said hollow channels having a wall thickness being less than said thickness of said plate body.

2. The chamber filter plate according to claim 1, wherein said hollow channels are formed by an interior gas pressure method.

3. The chamber filter plate according to claim 1, wherein said hollow channels are formed by introduction of a slurry-like or liquid or gaseous fluid serving as a mold core for formation of said hollow channels are during cooling of the chamber filter plate.

4. A method of producing a chamber filter plate, the method comprising the following steps:
    forming the chamber filter plate of claim 1 by an interior gas pressure method.

5. A method of producing a chamber filter plate, the method comprising the following steps:
    forming the chamber filter plate of claim 1 by introduction of a slurry-like or liquid or gaseous fluid serving as a mold core for formation of said at least one hollow channel during cooling of the chamber filter plate.

6. The chamber filter plate according to claim 1, wherein said plate body and said plate edge are formed as one piece.

7. The chamber filter plate according to claim 1, wherein said plate edge has a plurality of slits formed therein extending from said hollow channel towards said plate body.

* * * * *